Patented July 2, 1929.

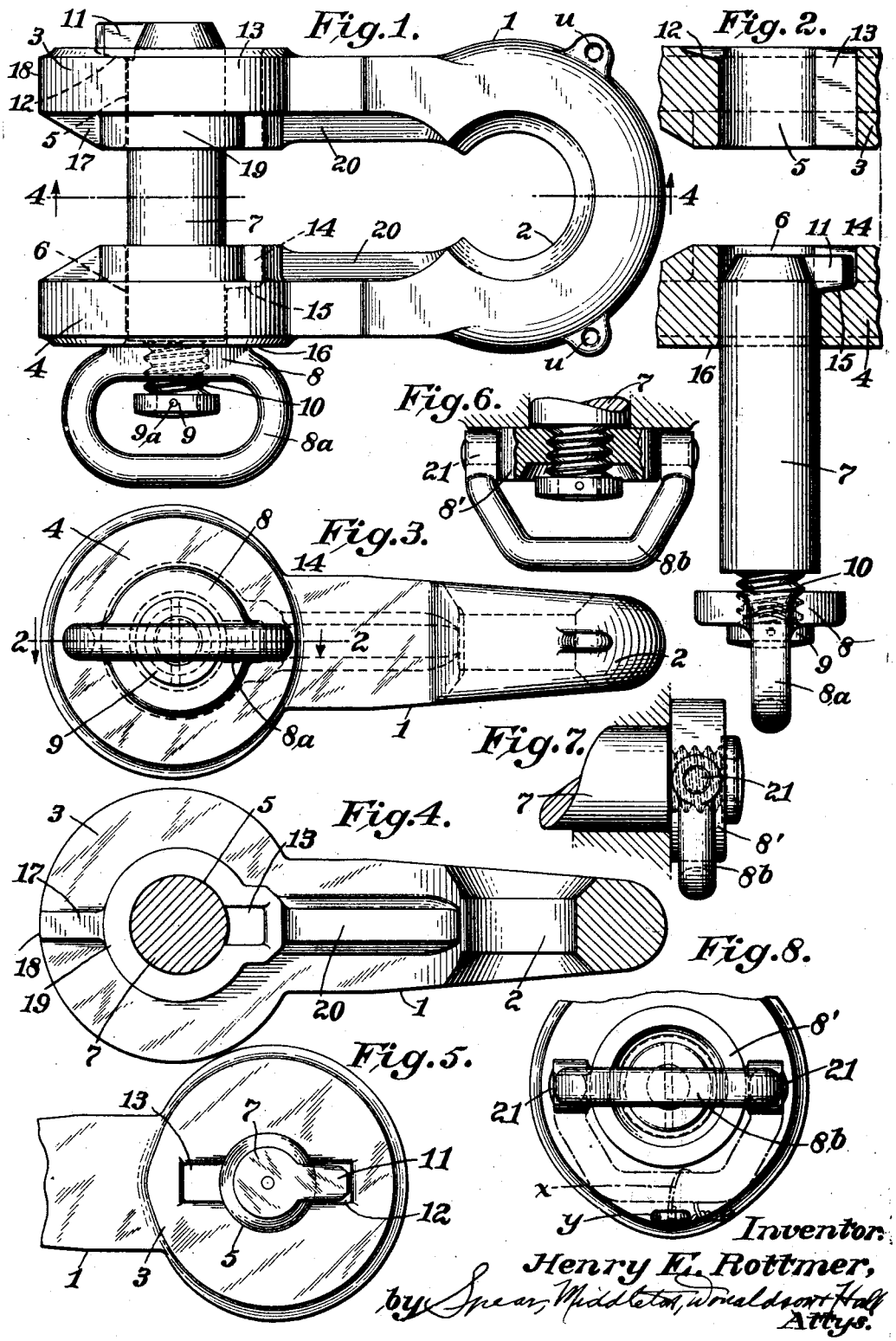

1,719,673

UNITED STATES PATENT OFFICE.

HENRY E. ROTTMER, OF WASHINGTON, DISTRICT OF COLUMBIA.

SHACKLE.

Application filed February 10, 1928. Serial No. 253,393.

My invention relates to improvements in shackles, clevises and other connecting appliances of that type.

An object of the invention is to provide the foregoing appliance with a movable pin which may be manipulated by one hand and simultaneously lock the same on both sides of such appliance and be inseparable from the shackle or connecting link.

Another object of the invention is to provide a shackle which is self-clearing of any debris such as ice or mud so that its effective operation will not be hampered by freezing nor clogging.

Other objects will appear hereinafter.

It is to be understood that various forms of connecting appliances are embraced in this specification of whatever form they may be under the term shackle.

The invention consists in the features, combination and arrangement of parts hereinafter described and particularly pointed out in the claims.

In the drawings:

Fig. 1 is a view of the shackle showing the pin or bolt locked in position in the clevis.

Fig. 2 is a partial sectional view taken on line 2—2 of Fig. 3 with the bolt unlocked and withdrawn, leaving the opening between the arms unobstructed.

Fig. 3 is a side view of the shackle shown in Fig. 1.

Fig. 4 is section taken on line 4—4 of Fig. 1 looking in the direction of the arrows.

Fig. 5 is a side view of the shackle looking from the top of Fig. 1.

Figs. 6 and 7 are views of a modified form of handle for the locking nut, in which the handle is pivoted to the locking nut, and free to fold down on shank of shackle to which it may be strapped by wire through an eyelet provided for that purpose.

Fig. 8 shows the pivoted handle with means for fixing it in folded position.

Referring to the drawings, 1 represents the shackle or clevis having an eye or loop portion 2 from which arms 3 and 4 extend. The arms are provided with aligning bores or eyes 5 and 6 adapted to receive the shackle bolt 7 which extends between and beyond them and affords a bearing for the member to which the shackle is to be connected, such as a hook or the link of a chain or ring bolt, etc.

The shackle bolt 7 has a locking nut 8 threadedly mounted at one end thereof said nut being provided with a handle $8^a$ by which the bolt is to be manipulated in inserting, locking, or in withdrawing it in the shackle. A terminal abutment 9 is provided on the end of the shackle bolt adjacent to the threaded portion 10 thereof. This abutment serves, together with the screw threaded portion 10, to limit the movement of the locking nut 8 and to provide a means whereby the nut will engage the bolt so that the bolt may be turned by means of the handle $8^a$ of the nut 8. This renders the locking nut rigidly combined with the bolt (temporarily) and thus it becomes an effective handle of the bolt to manipulate the same. Having done so it reverts back to its function as a means of locking the pin at both ends simultaneously.

At its opposite end the bolt 7 is provided with a laterally projecting locking lug 11 adapted to be received in a correspondingly shaped recess 12 formed in the arm 3 and communicating with the mouth of the bore 5. The locking lug and its corresponding recess are shown with their bottoms inclined downwardly but they may be of any suitable shape or form.

Preferably opposite to the recess 12 is the mouth of gate 13, which gate is coextensive with bore 5 and communicating therewith to form a lateral enlargement thereof. The gate 13 is adapted to receive the lug 11 of the bolt in inserting or withdrawing the bolt.

Aligning with the gate 13 in arm 3 is a recess 14 in arm 4 opening inwardly and communicating laterally with the bore 6. The recess 14 is adapted to receive the lug 11 of the bolt when the bolt is in the position shown in Fig. 2, the wall portion 15 of the arm 4 engaging the lug to limit the outward movement of the bolt and to prevent its disconnection from the clevis, and thus keep the bolt aligned with its seating bores and ready for instant connection again by a mere pushing on its outer end without requiring any expert manipulation. This function can readily be performed with one hand, thus accomplishing connection in cramped places where instant service is essential.

As shown in Fig. 1, when the locking lug 11 is snugly fitted into its locking recess 12, the threaded portion of the bolt still extends into the bore 6 so that the locking nut 8 may be screwed tightly against the portions 16 of the arm 4 to lock the bolt in position at both ends simultaneously. The nut 8 may be locked in position, if desired, by a wire seal wrapped around the screw threaded portion adjacent to the nut or as shown in Fig. 8 a wire *x* may be attached to an eye *y* and thus may be made to embrace the handle to hold it in locked position, said wire being drawn tight by twisting its ends. By using such a wire seal backing out is prevented. In place of the wire seal, any other form of nut lock or lock nut could be employed, such as an additional lock nut or lock washer interposed between the abutment 9 and the locking nut 8, and adapted to engage locking nut 8 to lock the same in the position shown in Fig. 1.

In the operation of this device, which will be apparent from the above description, to unlock and withdraw the bolt from the position shown in Fig. 1 to that shown in Fig. 2, the nut 8 is backed away from the arm 4 and up against abutment 9. The bolt is then pushed forward by means of the handle 8a of nut 8, the nut engaging the threads on the bolt, so that the lug 11 is removed from its recess 12 and clears the same, and the outer face of arm 3. The bolt is then turned by means of handle 8a in the direction which maintains its contact with the abutment, in the embodiment shown in a counter-clockwise direction, until the lug 11 aligns with gate 13 whereupon the bolt may be withdrawn to the position shown in Fig. 2.

Reversing the operation by inserting the bolt, from the position of Fig. 2 to that of Fig. 1, the bolt is pushed forward so that the lug 11 passes back through gate 13 and clears the outer face of arm 3 whereupon it is turned by handle 8a while the nut maintains its contact with the abutment (in this case counter-clockwise), until the lug is in position to be received in recess 12. The bolt is then pulled backward so that the lug will snap into the recess and the nut 8 is tightened against the arm 4 to lock the shackle bolt in position, at both ends simultaneously.

Only one hand is necessary to operate this device, to insert, lock, or withdraw the shackle bolt. The nut when backed off from the shackle arm into engagement with the abutment, is used to turn the bolt to its various positions all with one hand, and all in one direction of turning, thus leaving the other hand free to complete the hooking-on process. Thus one operator can do what otherwise would require the services of several, while under water, on the ocean floor in salvage work, or high up in the air on derricks and cranes at the top of tall buildings under great hazards. The connections often need to be made with great rapidity and under circumstances where emergency conditions exist, and where working space is limited.

In marine salvage work it is important to employ shackles or clevises of strong, rugged, simple and efficient construction, which are not liable to freeze or clog up with mud.

The present invention meets all of these requirements. Its construction is strong, robust, simple and efficient and positive of action and sure in its operation and functions under all sorts of conditions.

The shackle herein described cannot become frozen up or clogged with mud in such a way as to interfere with the insertion, locking, and withdrawal of the shackle bolt, since the screw threaded nut feature renders it absolutely self-clearing and neither ice nor mud can put it out of action.

The U or other shaped form of the shackle is to be so designed as to provide maximum strength to withstand the severe stress and strain to which it may be subjected in all kinds of service. The eye portion 2 is preferably made of heavy dimensions and the arms 3 and 4 as shown are of heavy design and especially reinforced by extra thicknesses of metal at the shackle bolt ends. Reinforcement or bracing portions 17 are provided between the ends 18 of the arms proper and the substantially cylindrical flange portions 19. Other reinforcement portions are provided at 20.

In Figs. 6 and 7 the handle 8a is shown pivotally mounted at 21 on its nut 8, so that the handle may be swung down out of the way when not in use, and locked to shank of shackle.

The threaded portion of the bolt is shown of reduced diameter with respect to the bolt proper, but may be made of substantially the same size, in which case a larger handle and nut would be necessary. The abutment 9 may be so secured through rivet 9a or clinching that it can not back off.

It is to be understood that other forms than the U shape or main body 1 may be used such for instance as fit flat on decks and walls etc. with suitable flanges to be fixed in place. In other words instead of the main body 1 being a movable member it may be a fixture and said fixture may be of various shapes.

Eyelets U are provided at the top for a strap to hoist or lower a heavy service shackle to its place of attachment.

The reinforcing ribs or flanges 17 are flared relative to each other so as to provide fair leads or guides for the introduction between the arms of the shackle.

I claim:

1. In combination in a shackle, a main body member, a shackle bolt rotatably mounted and movable across the open end of the said member in eyes provided in the arms thereof, said bolt having a handle member thereon for rotating the bolt and moving it across the said member between and beyond its arms, said handle member having screw-threaded engagement with said bolt, said bolt having an abutment for said handle member.

2. In combination in a shackle, a main body member, a shackle bolt rotatably mounted and movable across the open end of the said member in eyes provided in the arms thereof, said bolt at one end having a handle member thereon for rotating the bolt and moving it across the body member between and beyond its arms, said handle member having screw threaded engagement with said bolt, said bolt having at its end an abutment for said handle member, said handle member comprising a clamping nut adapted to engage the arm of the body member to clamp the bolt therein.

3. A shackle bolt having at one end thereof a locking lug and at the other end having a screw threaded portion, a handle member mounted on the screw threaded portion of said bolt, and a terminal abutment on said bolt for said handle, against which the handle stops.

4. In combination in a shackle, a main body member, a shackle bolt rotatably mounted and movable across the open end of the body member in eyes provided in the arms thereof, said bolt having a locking lug projecting laterally from one end thereof, said body member having a recess for receiving said locking lug, said bolt at its opposite end having a screw threaded portion, a threaded handle member mounted on said screw threaded portion, and a terminal abutment on said bolt for said handle member, said threaded portion of the bolt, when the locking lug is seated in said recess, extending into the eye of the adjacent arm of the body member, said handle member being adapted to be screwed against the arm to clamp the bolt in seated position at both ends simultaneously.

5. A shackle bolt having at one end thereof a locking lug and at the other end having a screw threaded portion, a threaded handle member mounted on said screw threaded portion and a terminal abutment on said bolt which limits the outward screw threaded movement of the handle member and provides for turning of the bolt in the shackle.

6. In combination with a shackle, a shackle bolt movably mounted in said shackle, said bolt having a lug at one end thereof adapted to seat in a recess formed in the shackle, said bolt at its opposite end having a threaded portion and a terminal abutment, a threaded handle member mounted on said threaded portion and adapted when turned in one direction to engage the side of the shackle to clamp the bolt therein, and when turned in the opposite direction to engage the abutment to permit turning of the bolt by means of the handle member upon pushing against the handle to unseat the lug.

7. Apparatus according to claim 6 in which said handle member comprises a nut portion and a handle portion pivotally mounted on said nut portion.

8. Apparatus according to claim 6 in which the handle is adapted to be folded against the side of the shackle, and means for holding said handle in its folded position.

In testimony whereof, I affix my signature.

HENRY E. ROTTMER.